United States Patent
Takeda et al.

(10) Patent No.: US 12,454,227 B2
(45) Date of Patent: Oct. 28, 2025

(54) DISPLAY CONTROLLER, DISPLAY CONTROL METHOD, AND STORAGE MEDIUM

(71) Applicant: ISUZU MOTORS LIMITED, Yokohama (JP)

(72) Inventors: Ai Takeda, Fujisawa (JP); Takuya Honda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 148 days.

(21) Appl. No.: 18/510,374

(22) Filed: Nov. 15, 2023

(65) Prior Publication Data

US 2024/0198923 A1 Jun. 20, 2024

(30) Foreign Application Priority Data

Dec. 14, 2022 (JP) ................................. 2022-199752

(51) Int. Cl.
*B60R 1/00* (2022.01)
*B60R 11/02* (2006.01)
*G08G 1/09* (2006.01)

(52) U.S. Cl.
CPC ...... *B60R 11/0264* (2013.01); *B60R 11/0229* (2013.01); *B60R 2300/108* (2013.01); *B60R 2300/207* (2013.01); *B60R 2300/301* (2013.01); *B60R 2300/302* (2013.01); *B60R 2300/8086* (2013.01)

(58) Field of Classification Search
CPC ....... B60R 1/00; B60R 11/02; B60R 11/0264; B60R 11/0229; G08G 1/09
See application file for complete search history.

(56) References Cited

U.S. PATENT DOCUMENTS

| | | | |
|---|---|---|---|
| 9,477,894 B1 * | 10/2016 | Reed | G06V 20/586 |
| 2007/0112516 A1 | 5/2007 | Taniguchi | |
| 2013/0110346 A1 * | 5/2013 | Huber | G08G 1/165 |
| | | | 701/33.9 |
| 2013/0222592 A1 * | 8/2013 | Gieseke | G08G 1/096708 |
| | | | 348/148 |
| 2017/0236414 A1 | 8/2017 | Nishimura | |

(Continued)

FOREIGN PATENT DOCUMENTS

| | | |
|---|---|---|
| CN | 104553982 A | 4/2015 |
| DE | 102006028625 A1 | 10/2007 |

(Continued)

*Primary Examiner* — Tan Q Nguyen
(74) *Attorney, Agent, or Firm* — PROCOPIO, CORY, HARGREAVES & SAVITCH LLP

(57) ABSTRACT

A display controller includes a receiving part that receives setting of a vehicle height of a vehicle, an acquisition part that acquires a height limit of a vehicle height indicated by a vehicle height restriction regulatory sign installed in a region ahead of the vehicle, and a display control part that cause a display part to display an image corresponding to the regulatory sign, wherein the display control part causes the display part to display the image if the set height of the vehicle received by the receiving part is greater than the height limit of the vehicle height acquired by the acquisition part, and does not cause the display part to display the image if the set height of the vehicle is equal to or less than the height limit of the vehicle height.

16 Claims, 6 Drawing Sheets

(56) References Cited

U.S. PATENT DOCUMENTS

| | | | |
|---|---|---|---|
| 2019/0035057 A1* | 1/2019 | Naserian | G06T 7/73 |
| 2020/0156630 A1* | 5/2020 | Schmidt | B60W 30/0956 |
| 2020/0184812 A1* | 6/2020 | Han | G08G 1/09626 |
| 2022/0041106 A1* | 2/2022 | Yorifuji | B60W 50/14 |
| 2022/0139222 A1* | 5/2022 | Bao | G08G 1/163 |
| | | | 701/24 |

FOREIGN PATENT DOCUMENTS

| | | |
|---|---|---|
| DE | 102009006910 A1 | 8/2010 |
| DE | 102013209873 B4 | 7/2019 |
| JP | H04-134600 A | 5/1992 |
| JP | H08-271078 A | 10/1996 |
| JP | H10-315888 A | 12/1998 |
| JP | H11-271078 A | 10/1999 |
| JP | 2001-195690 A | 7/2001 |
| JP | 2005-063398 A | 3/2005 |
| JP | 2007-137116 A | 6/2007 |
| JP | 2012-063881 A | 3/2012 |
| JP | 2014-006707 A | 1/2014 |
| JP | 2015-134517 A | 7/2015 |
| JP | 2017-142756 A | 8/2017 |
| JP | 2018-036728 A | 3/2018 |
| JP | 2018-181272 A | 11/2018 |
| JP | 2019-069657 A | 5/2019 |
| JP | 2020-160929 A | 10/2020 |
| JP | 2021-077201 A | 5/2021 |

* cited by examiner

| RANGE OF SET VEHICLE HEIGHTS |
|---|
| NO LIMIT |
| OVER 3.4m AND 3.9m OR LESS |
| OVER 2.9m AND 3.4m OR LESS |
| OVER 2.4m AND 2.9m OR LESS |
| OVER 1.9m AND 2.4m OR LESS |
| 1.9m OR LESS |

FIG. 2

| RANGE OF VEHICLE HEIGHTS |
|---|
| 1.9m OR LESS |
| 2.0m TO 2.4m |
| 2.5m TO 2.9m |
| 3.0m TO 3.4m |
| 3.5m TO 3.9m |
| 4.0m TO 4.4m |
| 4.5m TO 5.0m |

FIG. 3

|  |  | RANGE OF SET VEHICLE HEIGHTS ||||| 
|---|---|---|---|---|---|---|
|  |  | 1.9m OR LESS | 2.4m OR LESS | 3.4m OR LESS | 3.9m OR LESS | NO LIMIT |
| RANGE OF VEHICLE HEIGHTS | 1.9m OR LESS | ○ | ○ | ○ | ○ | ○ |
|  | 2.0m TO 2.4m | × | ○ | ○ | ○ | ○ |
|  | 2.5m TO 2.9m | × | × | ○ | ○ | ○ |
|  | 3.0m TO 3.4m | × | × | ○ | ○ | ○ |
|  | 3.5m TO 3.9m | × | × | × | ○ | ○ |
|  | 4.0m TO 4.4m | × | × | × | × | ○ |
|  | 4.5m TO 5.0m | × | × | × | × | ○ |

FIG. 4

DISPLAY CONTROLLER, DISPLAY CONTROL METHOD, AND STORAGE MEDIUM

CROSS-REFERENCE TO RELATED APPLICATIONS

The present application claims priority to Japanese Patent Application number 2022-199752, filed on Dec. 14, 2022, contents of which are incorporated herein by reference in its entirety.

BACKGROUND OF THE INVENTION

The present disclosure relates to a display controller, a display control method, and a storage medium. A conventional driver assistance device provides notification to a driver when the height of a vehicle exceeds an upper limit value of a vehicle height indicated by a vehicle height restriction regulatory sign (for example, Japanese Unexamined Patent Application Publication No. 2014-6707.)

The conventional driver assistance device sometimes fails to notify a driver even though the vehicle height of his/her vehicle is greater than an upper limit value of the vehicle height indicated by a regulatory sign when loaded goods are loaded on the vehicle such that the vehicle height of his/her vehicle becomes greater than before loading.

BRIEF SUMMARY OF THE INVENTION

The present disclosure focuses on this point, and its object is to provide a notification that corresponds to the actual vehicle height.

A display controller according to a first aspect of the present disclosure including: a receiving part that receives setting of a vehicle height of a vehicle; and an acquisition part that acquires a height limit of a vehicle height indicated by a vehicle height restriction regulatory sign installed in a region ahead of the vehicle: and a display control part that causes a display part to display an image corresponding to the regulatory sign, wherein the display control part causes the display part to display the image if the set height of the vehicle received by the receiving part is greater than the height limit of the vehicle height acquired by the acquisition part, and does not cause the display part to display the image if the set height of the vehicle is equal to or less than the height limit of the vehicle height.

A display control method according to a second aspect of the present disclosure is executed by a processor and including: receiving setting of a vehicle height of a vehicle: acquiring a height limit of a vehicle height indicated by a vehicle height restriction regulatory sign installed in a region ahead of the vehicle; and causing a display part to display an image corresponding to the regulatory sign, wherein the causing the display part to display includes: causing the display part to display the image if the set height of the vehicle is greater than the height limit of the vehicle height, and causing the display part not to display the image if the set height of the vehicle is equal to or less than the height limit of the vehicle height.

A non-transitory storage medium according to a third aspect of the present disclosure stores a program that causes a processor to execute: receiving setting of a vehicle height of a vehicle: acquiring a height limit of a vehicle height indicated by a vehicle height restriction regulatory sign installed in a region ahead of the vehicle; and causing a display part to display an image corresponding to the regulatory sign: wherein the causing the display part to display includes: causing the display part to display the image if the set height of the vehicle is greater than the height limit of the vehicle height, and causing the display part not to display the image if the set height of the vehicle is equal to or less than the height limit of the vehicle height.

BRIEF DESCRIPTION OF THE DRAWINGS

FIG. 2 illustrates a range of set vehicle heights.

FIG. 3 illustrates a range of height limits.

FIG. 4 shows a determination table stored in a storage 32.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of a Vehicle S>

Figure 1:
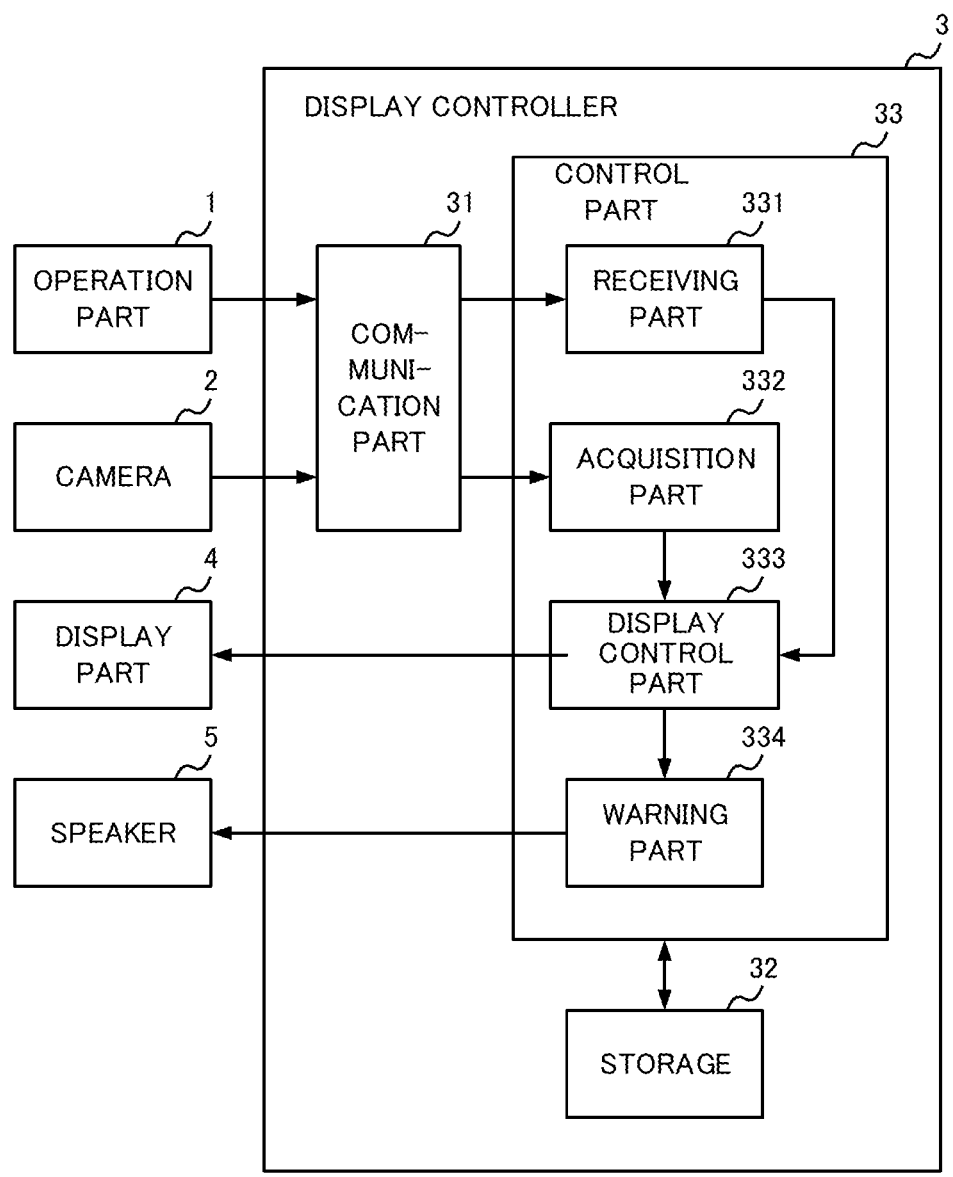
FIG. 1 is a diagram illustrating an outline of a vehicle S according to the present embodiment.

FIG. 1 is a diagram illustrating an outline of a vehicle S according to the present embodiment. The vehicle S shown in FIG. 1 includes an operation part 1, a camera 2, a display controller 3, a display part 4, and a speaker 5. The vehicle S has a function of alerting a driver when the height of the vehicle S is greater than a height limit of a vehicle height indicated by a vehicle height restriction regulatory sign installed ahead in the vehicle S's traveling direction. Alerting is a process of displaying an image for warning (hereinafter referred to as a "warning image") on the display part 4 or outputting sound for warning (hereinafter referred to as a "warning sound") from the speaker 5, for example.

The operation part 1 is a switch or a touch panel provided on an instrument panel or a steering wheel of the vehicle S. The driver can perform setting of the height of the vehicle S by operating the operation part 1.

The camera 2 extracts a vehicle height restriction regulatory sign from a captured image generated by capturing a region ahead in the vehicle S's traveling direction, and transmits (i) a height limit of a vehicle height indicated by said regulatory sign and (ii) a distance between the regulatory sign and the vehicle S to the display controller 3.

When the vehicle S's height received from the operation part 1 is greater than the height limit of the vehicle height acquired from the camera 2, the display controller 3 executes a process of displaying the warning image on the display part 4 or a process of outputting the warning sound from the speaker 5. The display controller 3 may have a housing including electronic components, or may be a printed circuit board on which the electronic components are mounted.

The display part 4 is a display that displays a speed, fuel level, time, temperature, or the like, and acquires a warning image from the display controller 3 and displays the warning image. The display part 4 is provided on the instrument panel of the vehicle S, but may instead be provided on an information terminal used by a driver.

The speaker 5 is provided around the instrument panel of the vehicle S, and acquires a warning sound output from the display controller 3 and outputs the warning sound.

There are cases where the height of the vehicle S on which loaded goods are loaded may become greater than the height of the vehicle S before the loaded goods were loaded. In such cases, even if the height of the vehicle S on which the loaded goods are loaded is greater than the height limit of the regulatory sign acquired from the camera 2, there is a possibility that the display controller 3 does not alert the driver, because the height of the vehicle S before the loaded goods were loaded, which is set in advance, is less than the height limit.

Therefore, the display controller 3 determines whether the vehicle S's height set by the driver operating the operation part 1 is higher than the height limit acquired from the camera 2, and alerts the driver if the vehicle S's height set by the driver operating the operation part 1 is higher than the height limit. By doing this, it is possible to display a warning image or output a warning sound that corresponds to the actual height of the vehicle S. Hereinafter, the configuration and operation of the display controller 3 will be described in detail.

<Configuration of the Display Controller 3>

The display controller 3 includes a communication part 31, a storage 32, and a control part 33. The control part 33 includes a receiving part 331, an acquisition part 332, a display control part 333, and a warning part 334.

The communication part 31 includes a communication device for transmitting and receiving information via a network or a digital signal transmission bus. The communication device is a controller area network (CAN) controller, for example.

The storage 32 includes a storage medium such as a read only memory (ROM), a random access memory (RAM), a hard disk drive (HDD), or a solid state drive (SSD). The storage 32 stores a program executed by the control part 33. The storage 32 stores various types of information for displaying a warning image on the display part 4 and outputting a warning sound to the speaker 5.

The control part 33 is a processor such as a central processing unit (CPU) or an electronic control unit (ECU), for example. The control part 33 functions as the receiving part 331, the acquisition part 332, the display control part 333, and the warning part 334 by executing the program stored in the storage 32. The control part 33 may be configured with a single processor, or may be configured with a plurality of processors or a combination of one or more processors and an electronic circuit. The configuration of each unit implemented by the control part 33 will be described below.

The receiving part 331 receives setting of a vehicle height of the vehicle S from the operation part 1. The receiving part 331 receives, as the setting of the vehicle height, a range of set vehicle heights which is a predetermined range of vehicle heights of the vehicle S, for example. Among a plurality of ranges of vehicle heights, the receiving part 331 receives a range including the vehicle height of the vehicle S as the range of the set vehicle heights, for example. FIG. 2 illustrates the range of the set vehicle heights. "1.9 m or less" shown in FIG. 2 indicates that the vehicle height of the vehicle S is greater than 0 and is 1.9 m or less, and "2.4 m or less" indicates that the vehicle height of the vehicle S is 2.4 m or less. Further, "no limit" shown in FIG. 2 indicates that the vehicle height of the vehicle S is greater than 0. The receiving part 331 stores the received range of the set vehicle heights in the storage 32.

The acquisition part 332 acquires, from the camera 2, the height limit of the vehicle height indicated by the vehicle height restriction regulatory sign installed ahead in the vehicle S's traveling direction. The acquisition part 332 acquires, as the height limit of the vehicle height, a range of height limits that is a predetermined range of height limits, for example. FIG. 3 illustrates the range of the height limits. Specifically, if a vehicle height restriction indicated by a regulatory sign extracted from the captured image by the camera 2 is "3.3 m", the acquisition part 332 acquires a range of height limits indicating "3.0 m to 3.4 m."

The acquisition part 332 may further acquire a distance between the regulatory sign and the vehicle S. The acquisition part 332 stores (i) the distance between the regulatory sign and the vehicle S and (ii) the range of the height limits that are acquired from the camera 2 in the storage 32. The acquisition part 332 may further acquire a vehicle speed of the vehicle S. For example, the acquisition part 332 acquires the vehicle speed of the vehicle S from a vehicle speed sensor (not shown) included in the vehicle S, and stores the vehicle speed in the storage 32 in association with a timing at which the vehicle speed is acquired.

The display control part 333 causes the display part 4 to display an image corresponding to a regulatory sign. The image is a warning image including characters indicating "height limit ahead" or "watch out for height", for example. The display control part 333 causes the display part 4 to display the warning image if the set height of the vehicle S received by the receiving part 331 is greater than the height limit of the vehicle height acquired by the acquisition part 332. For example, the display control part 333 causes the display part 4 to display the warning image if an upper limit value of the range of the set vehicle heights received by the receiving part 331 is equal to or greater than an upper limit value of the range of the height limits acquired by the acquisition part 332.

Specifically, it is assumed that the receiving part 331 receives a range of set vehicle heights indicating "3.4 m or less", and the acquisition part 332 acquires a range of height limits indicating "2.5 m to 2.9 m." In this case, the display control part 333 causes the display part 4 to display the warning image, because 3.4 m, which is the upper limit value of the range of the set vehicle heights, is equal to or greater than 2.9, which is the upper limit value of the range of the height limits. By operating in this manner, when the driver sets the actual vehicle height, the display control part 333 can provide a notification that corresponds to the actual vehicle height.

The display control part 333 does not cause the display part 4 to display the warning image if the set height of the vehicle S received by the receiving part 331 is equal to or less than the height limit of the vehicle height acquired by the acquisition part 332. For example, if the upper limit of the range of the set vehicle heights received by the receiving part 331 is less than the upper limit of the range of the height limits acquired by the acquisition part 332, the display control part 333 does not cause the display part 4 to display the warning image.

Specifically, it is assumed that the receiving part 331 receives a range of set vehicle heights indicating "3.4 m or less", and the acquisition part 332 acquires a range of height limits indicating "3.5 m to 3.9 m." In this case, the display control part 333 does not cause the display part 4 to display the warning image, because 3.4 m, which is the upper limit value of the range of the set vehicle heights, is less than 3.9 m, which is the upper limit value of the range of the height limits. By operating in this manner, the display control part 333 does not provide any notification to the driver when the height of the vehicle S is less than the vehicle height restriction, and therefore it can prevent redundant notification.

It should be noted that when the receiving part 331 receives a range of set vehicle heights indicating "no limit", the display control part 333 causes the display part 4 to display the warning image in response to acquisition of the range of the height limits by the acquisition part 332.

The display control part 333 may determine whether or not to cause the display part 4 to display the warning image by referencing a determination table stored in the storage 32. FIG. 4 shows the determination table stored in the storage 32. "o" shown in FIG. 4 indicates that the warning image is to be displayed on the display part 4, and "x" shown in FIG. 4 indicates that the warning image is not to be displayed on the display part 4.

For example, by referencing the determination table shown in FIG. 4, the display control part 333 identifies an operation corresponding to (i) the range of the set vehicle heights received by the receiving part 331 and (ii) the range of the height limits acquired by the acquisition part 332, and determines whether or not to cause the display part 4 to display the warning image. By operating in this manner, the display control part 333 can reduce a burden involved in a process for determining whether to cause the display part 4 to display or not.

The display control part 333 may cause the display part 4 to display the warning image if the set height of the vehicle S received by the receiving part 331 is equal to or greater than the height limit acquired by the acquisition part 332 and the distance between the regulatory sign and the vehicle S is equal to or less than a threshold value. For example, the display control part 333 causes the display part 4 to display the warning image if the upper limit value of the range of the set vehicle heights received by the receiving part 331 is equal to or greater than the upper limit value of the range of the height limits acquired by the acquisition part 332 and the distance between the regulatory sign and the vehicle S is equal to or less than the threshold value. The threshold value is a distance at which the driver can visually recognize a road corresponding to the vehicle height restriction regulatory sign correctly, and is stored in the storage 32.

For example, the display control part 333 causes the display part 4 to start displaying the warning image if (i) the distance between the regulatory sign and the vehicle S acquired by the acquisition part 332 at the current timing is equal to or less than the threshold value and (ii) the distance between the regulatory sign and the vehicle S acquired by the acquisition part 332 at an acquisition timing before the current timing is greater than the threshold value. By operating in this manner, the display control part 333 can prevent the driver from erroneously recognizing, as the warning image, a warning image corresponding to another regulatory sign that is different from the vehicle height restriction regulatory sign.

Further, the display control part 333 may end the displaying of the warning image in response to the fact that a first predetermined time period has passed since a timing at which the display control part 333 started the displaying of the warning image. The first predetermined time period is shorter than a time period from when the display part 4 starts displaying the warning image to when the vehicle S passes by the vehicle height restriction regulatory sign, and is stored in the storage 32. For example, the display control part 333 causes the display part 4 to end the displaying at a timing when the first predetermined time period, which is shorter than the time period from when the display part 4 starts displaying the warning image to when the vehicle S passes by the vehicle height restriction regulatory sign, has passed. By operating in this manner, the display control part 333 can prevent the display part 4 from displaying the warning image corresponding to the regulatory sign after the vehicle S has passed by said regulatory sign.

The warning part 334 outputs a warning sound from the speaker 5. The warning sound may be a single sound, such as a beep sound, or may be a voice stating "height limit ahead" or "please watch out for height," for example. The warning part 334 outputs the warning sound from the speaker 5 at a timing when the display control part 333 starts the displaying of the warning image. The warning part 334 outputs the warning sound from the speaker 5 by acquiring, from the display control part 333, display initiation information indicating that the display control part 333 caused the display part 4 to start displaying the warning image, for example. Since the warning part 334 operates in this manner, it becomes easier for the driver to notice that the display part 4 has displayed the warning image corresponding to the vehicle height restriction regulatory sign.

Although outputting the warning sound makes it easier for the driver to notice the warning image, the driver may feel annoyed if the warning sound continues to be output. Therefore, the warning part 334 ends the outputting of the warning sound at a timing when a second predetermined time period, which is shorter than the first predetermined time period, has passed since the timing at which the displaying of the warning image started. The second predetermined time period is a time period for outputting a warning sound, which is generated from sound data stored in the storage 32, once, for example.

Figure 5:
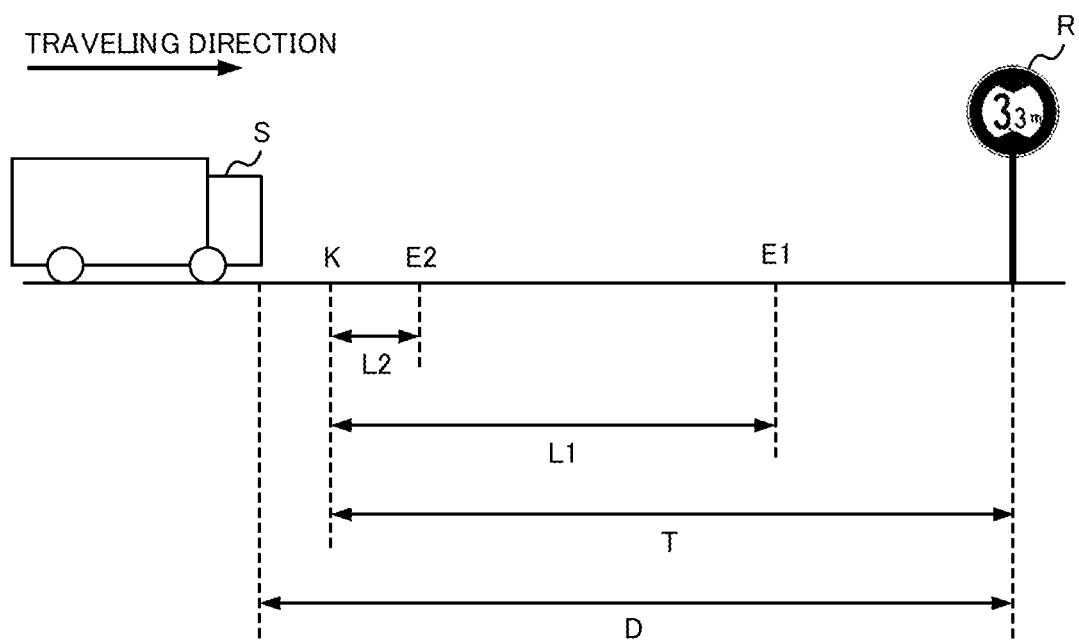
FIG. 5 illustrates an output time period of a warning sound and a display time period of a warning image.

FIG. 5 illustrates an output time period of the warning sound and a display time period of the warning image. In FIG. 5, the acquisition part 332 has acquired, at a timing before the current timing, (i) the range of the height limits "3.0 m to 3.4 m" corresponding to "3.3 m," which is a vehicle height restriction indicated by a regulatory sign R and (ii) a distance D between the regulatory sign R and the vehicle S. It should be noted that a position at which (i) a lane in which the vehicle S travels and (ii) a straight line passing through the regulatory sign R and perpendicular to said lane intersect each other may be different from the position of the regulatory sign R, but in the present embodiment, the distance between the regulatory sign R and the vehicle S is approximately used as the distance D. Further, it is assumed that the receiving part 331 has received the range of the set vehicle heights indicating any one of "3.4 m or less," "3.9 m or less," and "no limit" from the operation part 1.

In FIG. 5, if the front end of the vehicle S is at a position K, the display control part 333 causes the display part 4 to start displaying the warning image and the warning part 334 causes the speaker 5 to start outputting the warning sound in response to the fact that a distance between the vehicle S and the regulatory sign R has become equal to or less than a threshold value T. Then, at a position E2, where the vehicle S has travelled a distance L2 from the position K, the warning part 334 ends the outputting of the warning sound in response to the fact that the second predetermined time period has passed since the outputting of the warning sound was started. Further, at a position E1, where the vehicle S has travelled a distance L1 from the position K, the display control part 333 ends the displaying of the warning image in response to the fact that the first predetermined time has passed since the displaying of the warning image was started.

By operating in this manner, it is possible to prevent the driver from finding the warning sound annoying. Further, the driver will know that the regulatory sign R is installed by listening to the warning sound at the timing when the front end of the vehicle S is located between the position K and the position E2, and will know the range of the height limits by visually recognizing the warning image at the timing when the front end of the vehicle S is located between the position E2 and the position E1. As a result, it is possible to prevent the driver from forgetting to visually recognize the warning image displayed on the display part 4.

<Processing Sequence in the Display Controller 3>

Figure 6:
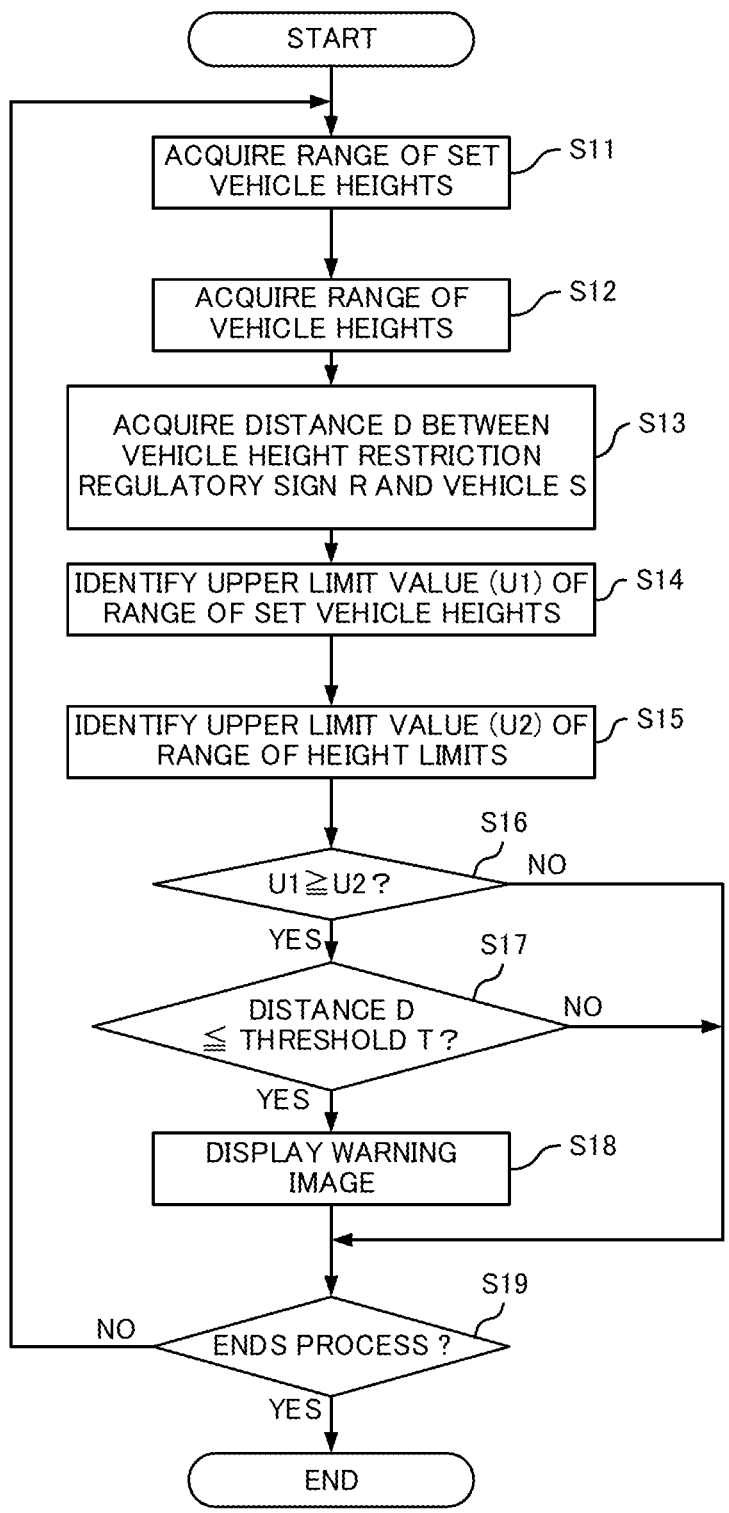
FIG. 6 shows an example of a processing sequence in a display controller 3.

FIG. 6 shows an example of a processing sequence in the display controller 3. The processing sequence shown in FIG. 6 shows an operation of notifying the driver that the vehicle height restriction regulatory sign is installed ahead in the vehicle S's traveling direction. "Notifying the driver" is, as an example, causing the display part 4 to display the warning image. FIG. 6 shows a case where the distance D between the regulatory sign R and the vehicle S acquired at the timing before the current timing from the camera 2 is equal to or greater than the threshold value T. The display controller 3 repeats the processing sequence shown in FIG. 6 at regular intervals.

The display control part 333 acquires the range of the set vehicle heights which the receiving part 1 has received from the operation part 1 and stored in the storage 32 (S11). The acquisition part 332 acquires the range of the height limits including the height limit indicated by the regulatory sign R installed ahead in the vehicle S's traveling direction (S12), and acquires the distance D between the regulatory sign R and the vehicle S (S13).

The display control part 333 identifies an upper limit value U1 of the range of the set vehicle heights received by the receiving part 331 (S14), and identifies an upper limit value U2 of the range of the height limits acquired by the acquisition part 332 (S15). If the upper limit value U1 of the range of the set vehicle heights is less than the upper limit value U2 of the range of the height limits (NO in S16), the display control part 333 does not display a warning image. If the upper limit value U1 of the range of the set vehicle heights is equal to or greater than the upper limit value U2 of the range of the height limits (YES in S16), the display control part 333 determines whether or not the distance D acquired from the camera 2 is equal to or less than the threshold value T (S17).

If the distance D is greater than the threshold value T (NO in S17), the display control part 333 does not display a warning image. If the distance D is equal to or greater than the threshold value T (YES in S17), the display control part 333 causes the display part 4 to display the warning image (S18). If an operation of ending the process is not performed (NO in S19), the display controller 3 repeats the processes from step S11 to step S18. If the operation of ending the process has been performed (YES in S19), the display controller 3 ends the process.

First Modified Example

In the above description, the operation of causing the display part 4 to display the warning image performed by the display control part 333 if the distance D between the regulatory sign R and the vehicle S acquired from the camera 2 by the acquisition part 332 is equal to or less than the threshold value T stored in the storage 32 is exemplified, but the present disclosure is not limited thereto.

The display control part 333 may identify, as the threshold value T, a distance travelled until the vehicle S stops, which is calculated on the basis of the vehicle speed of the vehicle S and a predetermined deceleration, and determine whether to cause the display part 4 to display the warning image using said threshold value T. The predetermined deceleration is a deceleration stored in the storage 32, and is, for example, determined according to a vehicle classification determined on the basis of at least one of a weight of the vehicle S or a passenger capacity of the vehicle S. For example, in a case where the vehicle S whose predetermined deceleration is 1.0 m per second is traveling at a speed of 30 km per hour, the display control part 333 calculates a distance of 34.7 m travelled until the vehicle S stops, and identifies the calculated distance as the threshold value T.

Second Modified Example

In the above description, the operation of causing the display part 4 to display the warning image performed by the display control part 333 if the distance D between the regulatory sign R and the vehicle S acquired by the acquisition part 332 is equal to or less than the threshold value is exemplified, but the present disclosure is not limited thereto. The display control part 333 may cause the display part 4 to display an image corresponding to a regulatory sign if the vehicle speed of the vehicle S is equal to or less than a threshold value. The threshold is a speed smaller than the minimum speed limit of the highway. For example, if the minimum speed limit is 50 km per hour, the threshold is 40 km per hour.

Third Modified Example

In the above description, the operation of determining whether or not the vehicle height of the vehicle S received by the receiving part 331 is greater than the height limit of the vehicle height indicated by the regulatory sign R is exemplified, but the present disclosure is not limited thereto. The display control part 333 may correct the vehicle height of the vehicle S received by the receiving part 331 on the basis of the weight of loaded goods of the vehicle S, and determine whether or not the corrected vehicle height is greater than the height limit of the vehicle height indicated by the regulatory sign R. The loaded goods include not only loaded goods but also passengers riding on the vehicle S. For example, the receiving part 331 receives information about the weight of the loaded goods of the vehicle S from a vehicle weight sensor (not shown). Then, the display control part 333 corrects the height of the vehicle S stored in the storage 32 on the basis of (i) the information about the weight of the loaded goods of the vehicle S received by the receiving part 331 and (ii) the weight of the loaded goods stored in the storage 32 in association with the vehicle height of the vehicle S received by the receiving part 331. When the corrected height of the vehicle S is greater than the height limit of the vehicle height acquired by the acquisition part 332, the display control part 333 causes the display part 4 to display an image corresponding to the regulatory sign R. By doing this, a display regarding vehicle height restrictions suitable for the vehicle height of the vehicle S can be displayed even when the vehicle height of the vehicle S changed during operation of the vehicle S due to a change in the carried load of the loaded goods or the like.

Fourth Modified Example

In the above description, the operation of causing the display part 4 to display the image corresponding to the regulatory sign R if the upper limit value of the range of the set vehicle heights received by the receiving part 331 is equal to or greater than the upper limit value of the range of the height limits acquired by the acquisition part 332 is exemplified, but the present disclosure is not limited thereto. The display control part 333 may cause the display part 4 to display an image corresponding to the regulatory sign R if the vehicle height of the vehicle S received by the receiving part 331 is equal to or greater than the height limit indicated by the regulatory sign R. For example, the display control part 333 causes the display part 4 to display the image corresponding to the regulatory sign R if (i) the vehicle height of the vehicle S received by the receiving part 331 is equal to or greater than the acquired height limit indicated by the regulatory sign R and (ii) the distance between the regulatory sign R and the vehicle S is equal to or less than a threshold value. The threshold value is a distance (i.e., braking distance) required for the vehicle S to travel before it comes to a stop. For example, the display control part 333 uses the braking distance calculated on the basis of the vehicle speed of the vehicle S and the predetermined deceleration, as the threshold value.

<Effect of the Display Controller 3>

As described above, the display controller 3 includes the receiving part 331 that receives the setting of the vehicle height of the vehicle S, the acquisition part 332 that acquires the height limit of the vehicle height indicated by the vehicle height restriction regulatory sign R installed ahead in the vehicle S's traveling direction, and the display control part 333 that causes the display part 4 to display the image corresponding to the regulatory sign. The display control part 333 causes the display part 4 to display the warning image if the set height of the vehicle S received by the receiving part 331 is greater than the height limit of the vehicle height acquired by the acquisition part 332.

By configuring the display controller 3 in this manner, the warning image can be displayed on the display part 4 if the vehicle height set by the driver is greater than the height limit of the vehicle height indicated by the regulatory sign R. As a result, the display controller 3 can provide the notification that corresponds to the actual vehicle height, because it can determine whether the vehicle height of the vehicle S after loaded goods are loaded is greater than the height limit even if the vehicle height becomes greater by loading the loaded goods on the vehicle S.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A display controller comprising:
   a receiving part that receives setting of a vehicle height of a vehicle; and
   an acquisition part that acquires a height limit of a vehicle height indicated by a vehicle height restriction regulatory sign installed in a region ahead of the vehicle and a distance between the regulatory sign and the vehicle; and
   a display control part that causes a display part to display an image corresponding to the regulatory sign,
   wherein the display control part causes the display part to display the image if the set height of the vehicle received by the receiving part is equal to or greater than the height limit acquired by the acquisition part and the distance between the regulatory sign and the vehicle acquired by the acquisition part is equal to or less than a threshold value.

2. The display controller according to claim 1, wherein the display control part identifies, as the threshold value, a distance to be travelled until the vehicle stops, which is calculated on a basis of a vehicle speed of the vehicle and a predetermined deceleration.

3. The display controller according to claim 1, wherein the display control part ends displaying of the image in response to that a first predetermined time period has passed since the displaying of the image was started.

4. The display controller according to claim 3, wherein the display control part causes the display part to end the displaying of the image at a timing when the first predetermined time period, which is shorter than a time period from when the display part starts displaying the image to when the vehicle passes by the regulatory sign, has passed.

5. The display controller according to claim 1, further comprising:
   a warning part that outputs a warning sound from a speaker, wherein
   the warning part ends the outputting of the warning sound in response to a second predetermined time period that is shorter than a first predetermined time has passed since the displaying of the image was started.

6. The display controller according to claim 1, wherein the acquisition part further acquires a vehicle speed of the vehicle, and
   the display control part causes the display part to display the image corresponding to the regulatory sign if a vehicle speed of the vehicle is equal to or less than a threshold value.

7. A display controller comprising:
   a receiving part that receives a range of set vehicle heights, which is a predetermined range of the vehicle height of a vehicle; and
   an acquisition part that acquires a range of height limits, which is a predetermined range of the height limit; and
   a display control part that causes a display part to display an image corresponding to a regulatory sign,
   wherein the display control part causes the display part to display the image if an upper limit value of the range of the set vehicle heights received by the receiving part is equal to or greater than an upper limit value of the range of the height limits acquired by the acquisition part, and does not cause the display part to display the image if the upper limit value of the range of the set vehicle heights is less than the upper limit value of the range of the height limits.

8. The display controller according to claim 7, wherein the acquisition part further acquires a distance between the regulatory sign and the vehicle, and
   the display control part causes the display part to display the image if the upper limit value of the range of the set vehicle heights received by the receiving part is equal to or greater than the upper limit value of the range of the height limits acquired by the acquisition part and a distance between the regulatory sign and the vehicle is equal to or less than a threshold value.

9. The display controller according to claim 8, wherein the display control part identifies, as the threshold value, a distance to be travelled until the vehicle stops, which is calculated on a basis of a vehicle speed of the vehicle and a predetermined deceleration.

10. A display controller comprising:
a receiving part that receives setting of a vehicle height of a vehicle and information about a weight of loaded goods of the vehicle; and
an acquisition part that acquires a height limit of a vehicle height indicated by a vehicle height restriction regulatory sign installed in a region ahead of the vehicle; and
a display control part that causes a display part to display an image corresponding to the regulatory sign,
wherein the display control part causes the display part to display the image if a height of the vehicle corrected from the setting of a vehicle height of a vehicle on a basis of the information about the weight of the loaded goods of the vehicle is greater than the height limit of the vehicle height acquired by the acquisition part.

11. A display control method executed by a processor and comprising:
receiving setting of a vehicle height of a vehicle;
acquiring a height limit of a vehicle height indicated by a vehicle height restriction regulatory sign installed in a region ahead of the vehicle and a distance between the regulatory sign and the vehicle; and
causing a display part to display an image corresponding to the regulatory sign, wherein
the causing the display part to display includes:
causing the display part to display the image if the set height of the vehicle is equal to or greater than the height limit and the distance between the regulatory sign and the vehicle is equal to or less than a threshold value.

12. A non-transitory storage medium storing a program that causes a processor to execute:
receiving setting of a vehicle height of a vehicle;
acquiring a height limit of a vehicle height indicated by a vehicle height restriction regulatory sign installed in a region ahead of the vehicle and a distance between the regulatory sign and the vehicle; and
causing a display part to display an image corresponding to the regulatory sign; wherein
the causing the display part to display includes:
causing the display part to display the image if the set height of the vehicle is equal to or greater than the height limit and the distance between the regulatory sign and the vehicle is equal to or less than a threshold value.

13. A display control method executed by a processor and comprising:
receiving a range of set vehicle heights, which is predetermined range of the vehicle heights of a vehicle; and
acquiring a range of height limits, which is predetermined range of the height limit; and
causing a display part to display an image corresponding to a regulatory sign,
wherein the causing the display part to display includes:
causing the display part to display the image if an upper limit value of the range of the set vehicle heights is equal to or greater than an upper limit value of the range of the height limits; and
not causing the display part to display the image if the upper limit value of the range of the set vehicle heights is less than the upper limit value of the range of the height limits.

14. A non-transitory storage medium storing a program that causes a processor to execute:
receiving a range of set vehicle heights, which is predetermined range of the vehicle heights of a vehicle; and
acquiring a range of height limits, which is predetermined range of the height limit; and
causing a display part to display an image corresponding to a regulatory sign,
wherein the causing the display part to display includes:
causing the display part to display the image if an upper limit value of the range of the set vehicle heights is equal to or greater than an upper limit value of the range of the height limits; and
not causing the display part to display the image if the upper limit value of the range of the set vehicle heights is less than the upper limit value of the range of the height limits.

15. A display control method executed by a processor and comprising:
receiving setting of a vehicle height of a vehicle and information about a weight of loaded goods of the vehicle;
acquiring a height limit of a vehicle height indicated by a vehicle height restriction regulatory sign installed in a region ahead of the vehicle; and
causing a display part to display an image corresponding to the regulatory sign,
wherein the causing the display part to display includes:
causing the display part to display the image if a height of the vehicle corrected from the setting of a vehicle height of a vehicle on a basis of the information about the weight of the loaded goods of the vehicle is greater than the height limit of the vehicle height.

16. A non-transitory storage medium storing a program that causes a processor to execute:
receiving setting of a vehicle height of a vehicle and information about a weight of loaded goods of the vehicle;
acquiring a height limit of a vehicle height indicated by a vehicle height restriction regulatory sign installed in a region ahead of the vehicle; and
causing a display part to display an image corresponding to the regulatory sign,
wherein the causing the display part to display includes:
causing the display part to display the image if a height of the vehicle corrected from the setting of a vehicle height of a vehicle on a basis of the information about the weight of the loaded goods of the vehicle is greater than the height limit of the vehicle height.

* * * * *